(12) United States Patent
Lu et al.

(10) Patent No.: US 10,768,739 B2
(45) Date of Patent: Sep. 8, 2020

(54) TOUCH PANEL, TOUCH DISPLAY DEVICE AND TOUCH PRESSURE DETECTION METHOD

(71) Applicant: SHANGHAI TIANMA MICRO-ELECTRONICS CO., LTD., Shanghai (CN)

(72) Inventors: Feng Lu, Shanghai (CN); Qijun Yao, Shanghai (CN); Conghua Ma, Shanghai (CN); Shaolong Ma, Shanghai (CN); Liang Liu, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 69 days.

(21) Appl. No.: 15/786,404

(22) Filed: Oct. 17, 2017

(65) Prior Publication Data
US 2018/0039370 A1 Feb. 8, 2018

(30) Foreign Application Priority Data
Jun. 30, 2017 (CN) .......................... 2017 1 0522365

(51) Int. Cl.
*G06F 3/041* (2006.01)
*G06F 3/044* (2006.01)
(Continued)

(52) U.S. Cl.
CPC ............ *G06F 3/0414* (2013.01); *G01L 1/146* (2013.01); *G01L 1/205* (2013.01); *G06F 3/044* (2013.01);
(Continued)

(58) Field of Classification Search
CPC .... G06F 3/0414; G06F 3/0412; G06F 3/0416; G06F 3/044; G06F 2203/04105; G01L 1/205; G01L 1/146
(Continued)

(56) References Cited

U.S. PATENT DOCUMENTS

2010/0053116 A1\* 3/2010 Daverman ............ G06F 3/0414
345/175
2010/0328229 A1\* 12/2010 Weber .................... G06F 1/1626
345/173
(Continued)

FOREIGN PATENT DOCUMENTS

CN 105975137 A 9/2016

*Primary Examiner* — Amit Chatly
(74) *Attorney, Agent, or Firm* — Alston & Bird LLP

(57) ABSTRACT

A touch panel is disclosed. The panel has a substrate having a touch region with a plurality of touch areas, a touch position detection apparatus, at least one pressure sensor group and a processor. The at least one pressure sensor group is disposed on the substrate. The pressure sensor group includes a first-type pressure sensor and a second-type pressure sensor. The first-type pressure sensor is located on a first side of the touch region and the second-type pressure sensor is located on a second side opposite to the first side of the touch region so that the first-type pressure sensor and the second-type pressure sensor of the same pressure sensor group are symmetric about the centerline of the touch panel. Each of the plurality of touch areas is associated with one of the at least one pressure sensor group.

17 Claims, 16 Drawing Sheets

(51) Int. Cl.
*G01L 1/14* (2006.01)
*G01L 1/20* (2006.01)

(52) U.S. Cl.
CPC .......... *G06F 3/0412* (2013.01); *G06F 3/0416* (2013.01); *G06F 2203/04105* (2013.01)

(58) Field of Classification Search
USPC ................................................ 345/173–179
See application file for complete search history.

(56) References Cited

U.S. PATENT DOCUMENTS

| | | | | |
|---|---|---|---|---|
| 2012/0126941 | A1* | 5/2012 | Coggill | G06F 21/36 |
| | | | | 340/5.54 |
| 2016/0188103 | A1* | 6/2016 | Bernstein | G06F 3/016 |
| | | | | 345/158 |
| 2017/0010729 | A1* | 1/2017 | Chuang | G06F 3/0414 |
| 2018/0059839 | A1* | 3/2018 | Kim | H01L 51/5284 |

* cited by examiner

TOUCH PANEL, TOUCH DISPLAY DEVICE AND TOUCH PRESSURE DETECTION METHOD

CROSS-REFERENCES TO RELATED APPLICATIONS

This application claims priority to Chinese patent application No. CN201710522365.4, filed on Jun. 30, 2017, the disclosure of which is incorporated herein by reference in its entirety.

TECHNICAL FIELD

The present disclosure relates to the technology of a touch display, in particular to a touch panel, a touch display device and a touch pressure detection method in a touch panel.

BACKGROUND

Touch panels are widely used in mobile phones, tablet PCs, information query machines in public lobbies, etc. In this way, simply by touching signs on an electronic device via a finger, a user can operate the device, eliminating the user's dependence on other input devices (such as a keyboard, a mouse, etc.) and facilitating a human-computer interaction.

To better meet user requirements, usually a touch panel is further provided with a pressure sensor for detecting the touch pressure intensity amount when a user touches the touch panel, to enable pressure sensing. However, researches show that when a touch panel is continuously pressed, baseline of the pressure sensing may drift. As a result, the same pressure sensor outputs different pressure detection signals when the same position of the same display panel is pressed using the same amount of force. This will undoubtedly affect the pressure detection performance of the touch panel.

SUMMARY

The present disclosure provides a touch panel, a touch display device and a touch pressure detection method to improve the pressure detection performance of the touch panel.

According to the first aspect, an embodiment of the present disclosure provides a touch panel, including:
a substrate, which comprises a plurality of touch areas;
a touch position detection apparatus, which is disposed on the substrate;
at least one pressure sensor group, which is disposed on the substrate, wherein each of the at least one pressure sensor group comprises a first-type pressure sensor and a second-type pressure sensor; the first-type pressure sensor is located on a first side of the substrate and the second-type pressure sensor is located on a second side opposite to the first side of the substrate, the first-type pressure sensor and the second-type pressure sensor of the same pressure sensor group are symmetric about a centerline of the touch panel; and each of the plurality of touch areas corresponds to at least one of the at least one pressure sensor group; and
a processor, which is electrically connected to the touch position detection apparatus and the at least one pressure sensor group and controls the touch position detection apparatus to detect a current touch position, determines the touch area and calculates a touch pressure intensity according to a pressure detection signal of the at least one pressure sensor group corresponding to the touch area.

According to the second aspect, an embodiment of the present disclosure provides a touch display device including the touch panel provided by the embodiments of the present disclosure.

According to the third aspect, an embodiment of the present disclosure provides a touch pressure detection method for the touch panel provided by the embodiments of the present disclosure, including:
controlling, by the processor, the touch position detection apparatus to detect a current touch position; and
determining, by the processor, the touch area and calculating, by the processor, a touch pressure intensity according to a pressure detection signal of the at least one pressure sensor group corresponding to the touch area.

In the embodiments of the present disclosure, the pressure sensor group is disposed on the substrate. The pressure sensor group includes a first-type pressure sensor and a second-type pressure sensor. The first-type pressure sensor is located on a first side of the substrate and the second-type pressure sensor is located on a second side opposite to the first side of the substrate. The first-type pressure sensor and the second-type pressure sensor of the same pressure sensor group are symmetric about the centerline of the touch panel. In the pressure detection stage, a touch pressure intensity is calculated according to the pressure detection signal of the pressure sensor group corresponding to the touch area. This eliminates the pressure sensor baseline drifting when an existing touch panel is continuously pressed and overcomes the poor pressure detection performance of the touch panel, i.e., improves the pressure detection performance of the touch panel.

DETAILED DESCRIPTION

The present disclosure will be described in further detail with reference to the accompanying drawings and embodiments. It is to be understood that the embodiments set forth below are intended to explain and not to limit the present disclosure. It is to be noted that for ease of description, only a part related to the present disclosure rather than the whole structure is illustrated in the accompanying drawings.

In an existing touch panel including a pressure sensor, when touch pressure detection is performed, usually a pressure detection signal output from the pressure sensor before a touch pressure is applied and that after the touch pressure is applied are compared to obtain a change in the pressure detection signal and then the touch pressure intensity is calculated from the change in the pressure detection signal. In this process, the pressure detection signal output from the pressure sensor before the touch pressure is applied is defined as a baseline.

Figure 1:
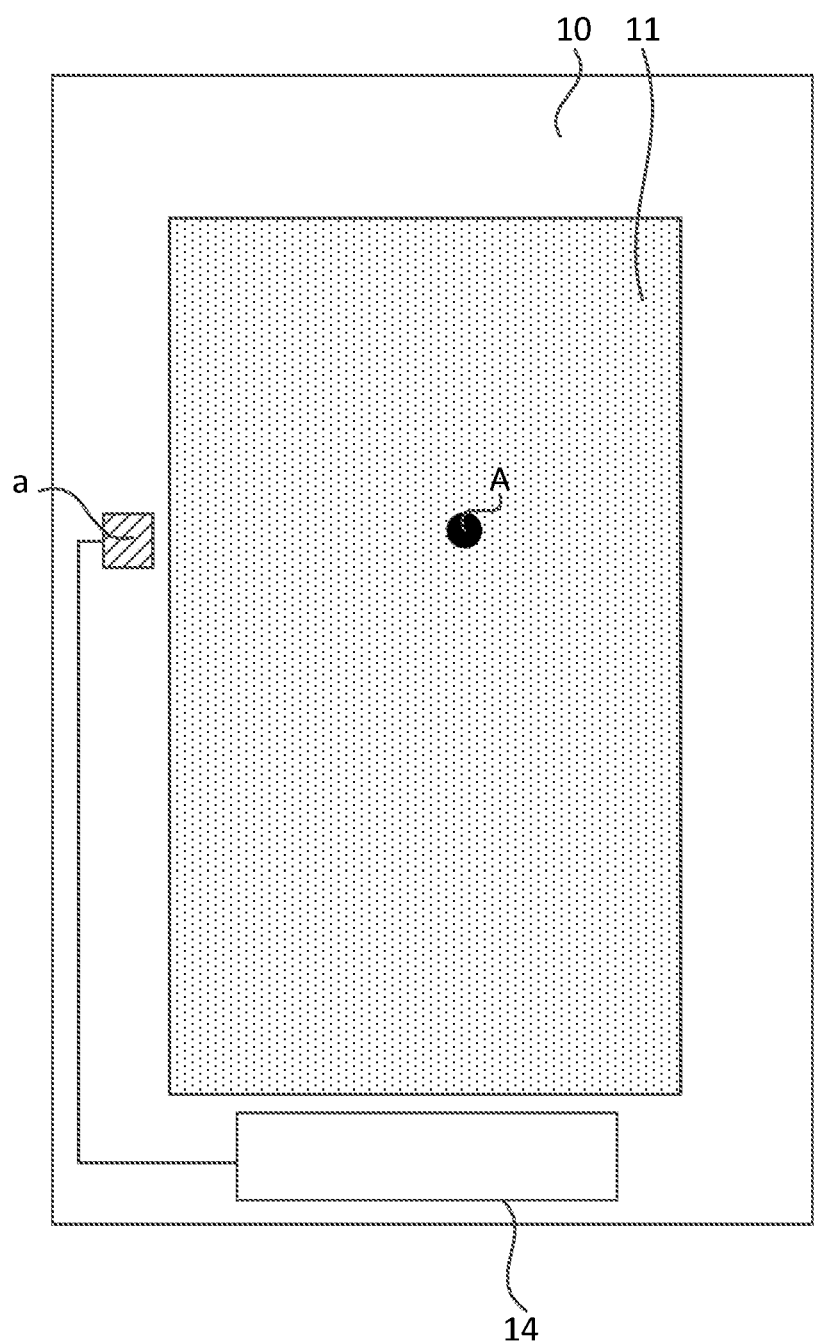
FIG. 1 is a structure diagram of a touch panel in the related art.
Figure 2:
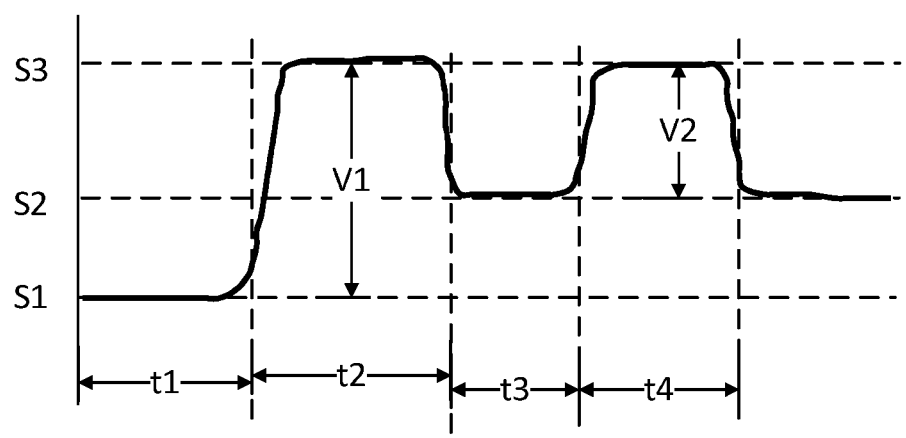
FIG. 2 illustrates a waveform of a pressure detection signal output from the pressure sensor a shown in FIG. 1 during a process where point A shown in FIG. 1 is pressed twice in succession using the same amount of force.

FIG. 1 is a structure diagram of a touch panel in the related art. FIG. 2 illustrates the waveform of pressure detection signals output from the pressure sensor a shown in FIG. 1 during a point A on the display area surface shown in FIG. 1 is pressed twice in succession using the same amount of force. FIG. 2 exemplarily illustrates four time periods, i.e., a first time period t1, a second time period t2, a third time period t3 and a fourth time period t4. The second time period t2 and the fourth time period t4 are pressing time periods and the first time period t1 and the third time period t3 are non-pressing time periods.

Referring to FIG. 1 and FIG. 2, the touch panel includes a substrate 10, a touchable area 11 disposed on the substrate 10 and a pressure sensor a disposed on the substrate 10.

Before the first pressing (i.e., in the first time period t1), the pressure detection signal output from the pressure sensor a is S1. At this time, S1 may be considered as the baseline of the pressure sensor a. During the first pressing (i.e., in the second time period t2), the pressure detection signal output from the pressure sensor a is S3. Compared to before the first pressing, the variation in the pressure detection signal output from the pressure sensor a is V1=S3−S1. After the first pressing and before the second pressing (i.e., in the third time period t3), the pressure detection signal output from the pressure sensor a is S2. At this time, S2, in place of S1, may be considered as the new baseline of the pressure sensor a. During the second pressing (i.e., in the fourth time period t4), the pressure detection signal output from the pressure sensor a is S3. Compared to before the second pressing, the variation in the pressure detection signal output from the pressure sensor a is V2=S3−S2. It can be seen from FIG. 2 that since S1 and S2 are not equal to each other, variations in pressure detection signals output from the pressure sensor a are different in the case where the same position of the touch panel is pressed twice using the same amount of force. As a result, touch pressure intensities calculated based on the variations in pressure detection signals obtained from these two pressings are also different.

This phenomenon is caused by the plasticity of the touch panel as an inelastic mechanical structure. In brief, the touch panel is deformed during the first pressing but is not fully recovered from the deformation after the first pressing at the time of the second pressing (i.e., in the third time period t3). As a result, the pressure detection signal output from the pressure sensor a in the first time period t1 is different from that in the third time period t3, causing the baseline drifting in the pressure sensor a.

Studies show that, when two pressure sensors located symmetrically around a point being pressed by an amount of touch pressure to the touch panel, one sensor baseline drifts up and the other sensor baseline drifts down.

Figure 3:
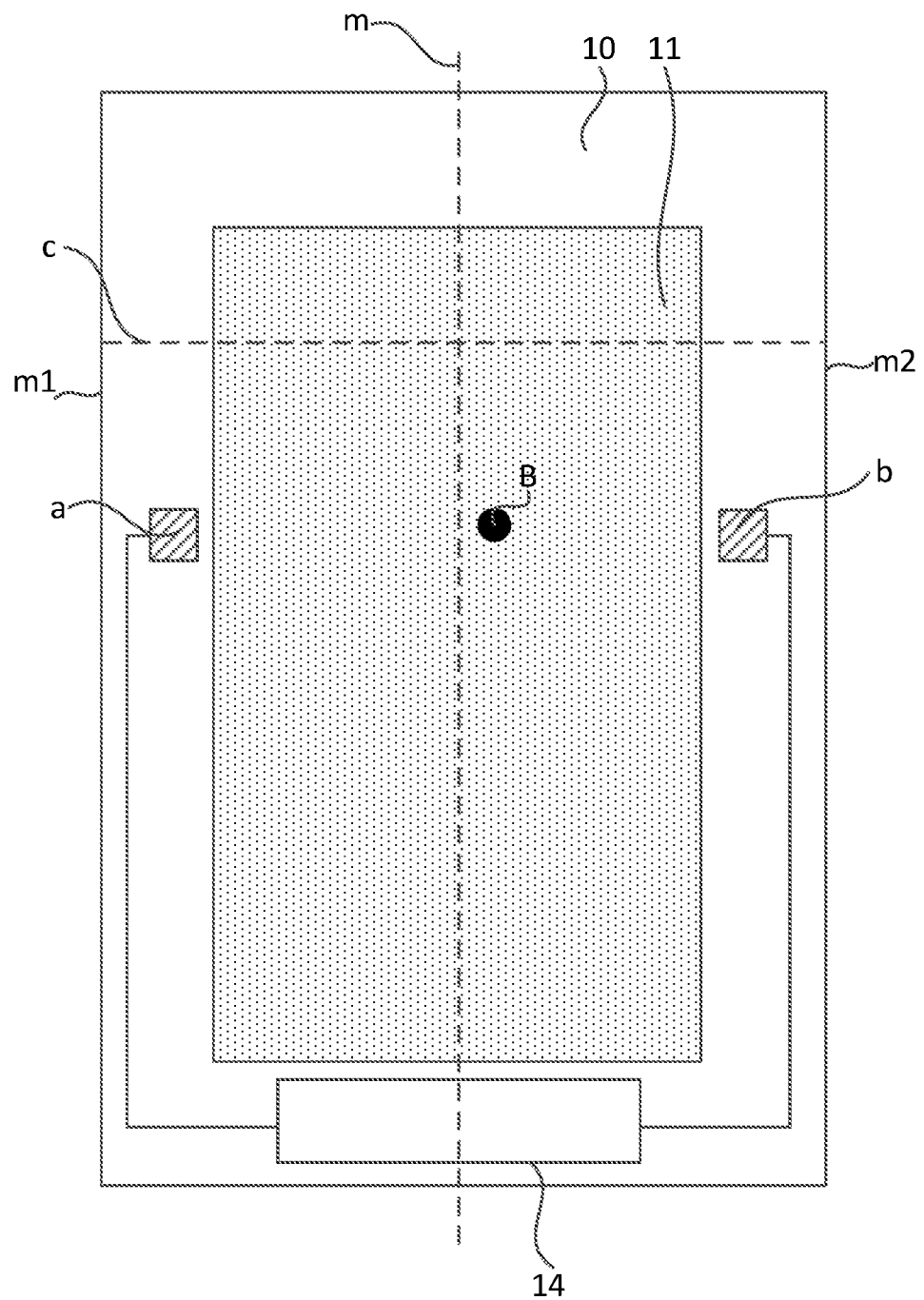
FIG. 3 is a structure diagram of a touch panel according to an embodiment of the present disclosure.
Figure 4:
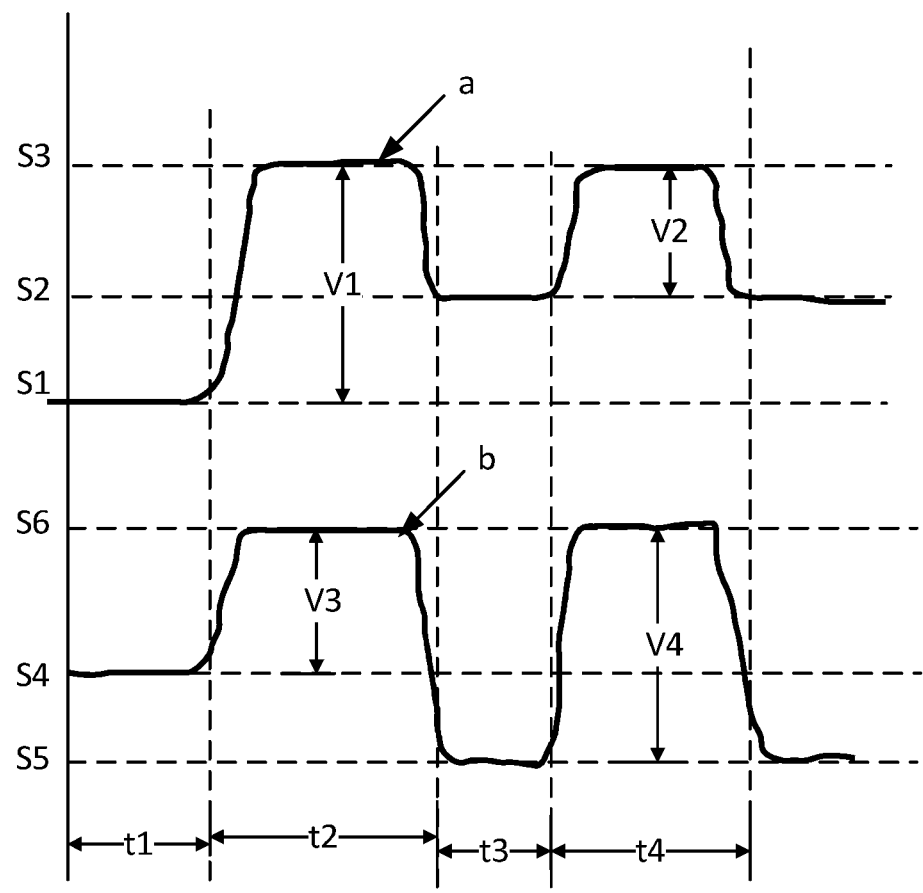
FIG. 4 illustrates the waveforms of a pressure detection signal output from the pressure sensor a and a pressure detection signal output from the pressure sensor b shown in FIG. 3 during the process where point B shown in FIG. 3 is pressed twice in succession using the same amount of force.

Specifically, FIG. 3 is a structure diagram of a touch panel according to an embodiment of the present disclosure. Referring to FIG. 3, the touch panel includes a pressure sensor b in addition to a pressure sensor a. A dotted line m is the centerline of the touch panel. Here the centerline refers to the touch panel's center line parallel to the two opposite sides (side m1 and side m2), i.e., the symmetry axis in Y-direction of the touch panel. The pressure sensor a and the pressure sensor b are symmetrically disposed about the centerline m. FIG. 4 illustrates the waveforms of the pressure detection signal output from the pressure sensor a and the pressure sensor b shown in FIG. 3 during the time point B in FIG. 3 is pressed twice in succession using the same amount of force. Referring to FIG. 3 and FIG. 4, before the first pressing (i.e., in the first time period t1), the pressure detection signal output from the pressure sensor a is S1 and the pressure detection signal output from the pressure sensor b is S4. During the first pressing (i.e., in the second time period t2), the pressure detection signal output from the pressure sensor a is S3 and the pressure detection signal output from the pressure sensor b is S6. Compared to before the first pressing, the variation in the pressure detection signal output from the pressure sensor a is V1=S3−S1 and the variation in the pressure detection signal output from the pressure sensor b is V3=S6−S4. After the first pressing and before the second pressing (i.e., in the third time period t3), the pressure detection signal output from the pressure sensor a is S2 and the pressure detection signal output the pressure sensor b is S5. During the second pressing (i.e., in the fourth time period t4), the pressure detection signal output from the pressure sensor a is S3 and the pressure detection signal output from the pressure sensor b is S6. Compared to before the second pressing, the variation in the pressure detection signal output from the pressure sensor a is V2=S3−S2 and the variation in the pressure detection signal output from the pressure sensor b is V4=S6−S5. Moreover, V1, V3, V2 and V4 satisfy the formula V1+V3=V2+V4. Additionally, supposing that the touch pressure intensity obtained based on the pressure detection signal variation V1 is F1, the touch pressure intensity obtained based on the pressure detection signal variation V2 is F2, the touch pressure intensity obtained based on the pressure detection signal variation V3 is F3 and the touch pressure intensity obtained based on the pressure detection signal variation V4 is F4, then F1, F3, F2 and F4 satisfy the formula F1+F3=F2+F4.

The above research findings show that since the two symmetrically disposed pressure sensors satisfy the formulas V1+V3=V2+V4 and F1+F3=F2+F4, when the touch pressure intensities are calculated using pressure detection signal output from the two symmetrically disposed pressure sensors, the two symmetrically disposed pressure sensors can mutually adjust the touch pressure intensities and the problem of poor pressure detection performance of the touch panel due to pressure sensor baseline drifting can be relieved.

Accordingly, an embodiment of the present disclosure provides a touch panel including a substrate, a touch position detection apparatus, at least one pressure sensor group and a processor. The substrate includes a plurality of touch areas. The touch position detection apparatus is disposed on the substrate. The at least one pressure sensor group is disposed on the substrate. Each pressure sensor group includes a first-type pressure sensor and a second-type pressure sensor. The first-type pressure sensor is located on the first side of the substrate and the second-type pressure sensor is located on the second side opposite to the first side of the substrate. The first-type pressure sensor and the second-type pressure sensor of the same pressure sensor group are symmetric about a centerline of the touch panel. Each of the plurality of touch areas corresponds to at least one pressure sensor group. The processor is electrically connected to the touch position detection apparatus and the at least one pressure sensor group. The processor is used for controlling the touch position detection apparatus to detect a current touch position, determining a related touch area and calculating a touch pressureintensity according to a pressure detection signal of the pressure sensor group corresponding to the touch area.

In the embodiment of the present disclosure, the pressure sensor group is disposed on the touch panel. Each pressure sensor group includes a first-type pressure sensor and a second-type pressure sensor. The first-type pressure sensor is located on a first side of the substrate and the second-type pressure sensor is located on a second side opposite to the first side of the substrate. The first-type pressure sensor and the second-type pressure sensor of the same pressure sensor group are symmetric about the centerline of the touch panel. Additionally, in the pressure detection stage, and a touch pressure intensity is calculated according to pressure detection signals of the pressure sensor group corresponding to the touch area. Substantially, pressure detection signals output from the first-type pressure sensor and the second-type pressure sensor of the same pressure sensor group are used to mutually adjust touch pressure intensities. In this way, the problem of poor pressure detection performance of the touch panel due to pressure sensor baseline drifting is relieved and the pressure detection performance of the touch panel is improved.

In the above technical solution, the plurality of touch areas form a touchable area of the touch panel. It is to be noted that the shape of the touch panel in the above technical solution may be varied, e.g., a circle, a triangle, a rectangle, an irregular shape, etc. If the touch panel is a rectangle, optionally, the plurality of touch areas are arranged in a matrix on the touch panel. Since the process of establishing a correspondence relationship between the touch areas and the pressure sensor groups involves programming, circuit design, etc., the matrix arrangement of the plurality of touch areas on the touch panel simplifies programming, circuit design, etc. Furthermore, currently, mobile phones, tablet PCs, etc. typically use rectangular touch panels. Rectangular touch panels are widely used for the moment.

Optionally, the touch panel includes N touch areas and N pressure sensor groups. N is greater than or equal to 1. The N touch areas are arranged in a matrix of N rows and one column on the touch panel. A first-type pressure sensor is disposed on a first side in a row direction of each touch area and a second-type pressure sensor is disposed on a second side opposite to the first side. The first-type pressure sensor and the second-type pressure sensor in the same row as the touch area form a pressure sensor group, and the touch area corresponds to the pressure sensor group in the same row as the touch area. The advantages of such configuration is that pressure detection signals output from the first-type pressure sensor and the second-type pressure sensor of the same pressure sensor group are used to mutually adjust touch pressure intensities, thereby achieving the purpose of relieving the problem of poor pressure detection performance of the touch panel due to pressure sensor baseline drifting and the effect of improving the pressure detection performance of the touch panel.

Figure 5:
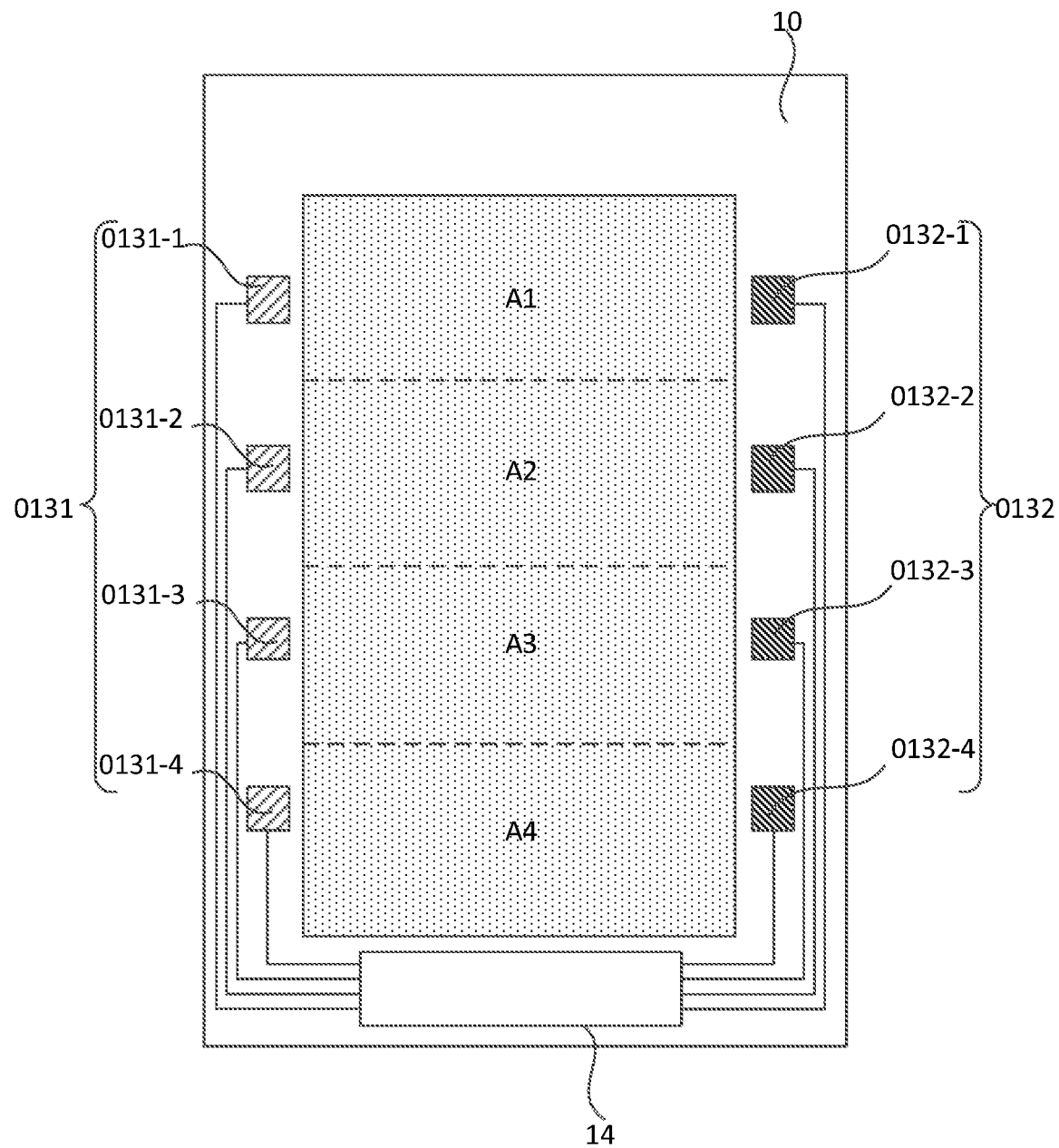
FIG. 5 is a structure diagram of another touch panel according to an embodiment of the present disclosure.

FIG. 5 is a structure diagram of another touch panel according to an embodiment of the present disclosure. Exemplarily, referring to FIG. 5, the touch panel includes a substrate 10, a touch position detection apparatus (not shown in FIG. 5) disposed on the substrate 10, pressure sensor groups disposed on the substrate 10, and a processor 14.

The touch panel includes four touch areas and four pressure sensor groups. The four touch areas are a touch area A1, a touch area A2, a touch area A3, and a touch area A4 respectively. The four touch areas are arranged in a matrix of four rows and one column on the touch panel. Each pressure sensor group includes a first-type pressure sensor 0131 and a second-type pressure sensor 0132. The first-type pressure sensors 0131 are located on a first side (left side of the substrate 10 in FIG. 5) of the substrate 10 and the second-type pressure sensors 0132 are located on a second side (right side of the substrate 10 in FIG. 5) opposite to the first side of the substrate 10. The first-type pressure sensor 0131 is disposed on a first side in a row direction of each touch area and the second-type pressure sensor 0132 is disposed on a second side opposite to the first side. The first-type pressure sensor 0131 and the second-type pressure sensor 0132 of the same pressure sensor group are symmetric about the centerline of the touch panel. The first-type pressure sensor 0131 and the second-type pressure sensor 0132 in the same row as the touch area form one pressure sensor group. In FIG. 5, the first-type pressure sensor 0131-1 and the second-type pressure sensor 0132-1 form one pressure sensor group, the first-type pressure sensor 0131-2 and the second-type pressure sensor 0132-2 form one pressure sensor group, the first-type pressure sensor 0131-3 and the second-type pressure sensor 0132-3 form one pressure sensor group, and the first-type pressure sensor 0131-4 and the second-type pressure sensor 0132-4 form one pressure sensor group. A touch area corresponds to the pressure sensor group in the same row as the touch area. In FIG. 5, the touch area A1 corresponds to the pressure sensor group formed by the first-type pressure sensor 0131-1 and the second-type pressure sensor 0132-1, the touch area A2 corresponds to the pressure sensor group formed by the first-type pressure sensor 0131-2 and the second-type pressure sensor 0132-2, the touch area A3 corresponds to the pressure sensor group formed by the first-type pressure sensor 0131-3 and the second-type pressure sensor 0132-3, and the touch area A4 corresponds to the pressure sensor group formed by the first-type pressure sensor 0131-4 and the second-type pressure sensor 0132-4. The processor 14 is electrically connected to the touch position detection apparatus and the pressure sensor groups and is used for controlling the touch position detection apparatus to detect a current touch position, determining a touch area and calculating a touch pressure intensity according to pressure detection signals of the pressure sensor group corresponding to the touch area.

Researches show that under the premise that the same bias voltage is applied to the pressure sensor, when the display panel is pressed using the constant amount force, the closer the touch position is to the pressure sensor, the greater the pressure detection signal output from the pressure sensor is and the less the pressure detection signal is overwhelmed by a noise signal. Based on the above research, optionally, the touch panel includes 2N touch areas and N pressure sensor groups. N is greater than or equal to 1. The 2N touch areas are arranged in a matrix of N rows and two columns on the touch panel. The first-type pressure sensor is disposed on a first side in a row direction of each touch area and the second-type pressure sensor is disposed on a second side opposite to the first side. The first-type pressure sensor and the second-type pressure sensor in the same row as the touch area form one pressure sensor group. The touch area corresponds to the pressure sensor group in the same row as the touch area and to the closest pressure sensor among the pressure sensor groups in adjacent rows. Such configurations have various advantages: on the one hand, pressure detection signals output from the first-type pressure sensor and the second-type pressure sensor of the same pressure sensor group are used to mutually adjust touch pressure intensities, thereby achieving the purpose of improving the pressure detection performance of the touch panel; on the other hand, the touch area is configured to correspond to the closest pressure sensor among the pressure sensor groups in adjacent rows so as to prevent the pressure detection signals of some pressure sensors (including first-type pressure sensors and second-type pressure sensors) corresponding to and farther from the touch area from being overwhelmed by noise due to too weak and avoid the undesirable phenomenon where the pressure detection accuracy decreases.

Figure 6:
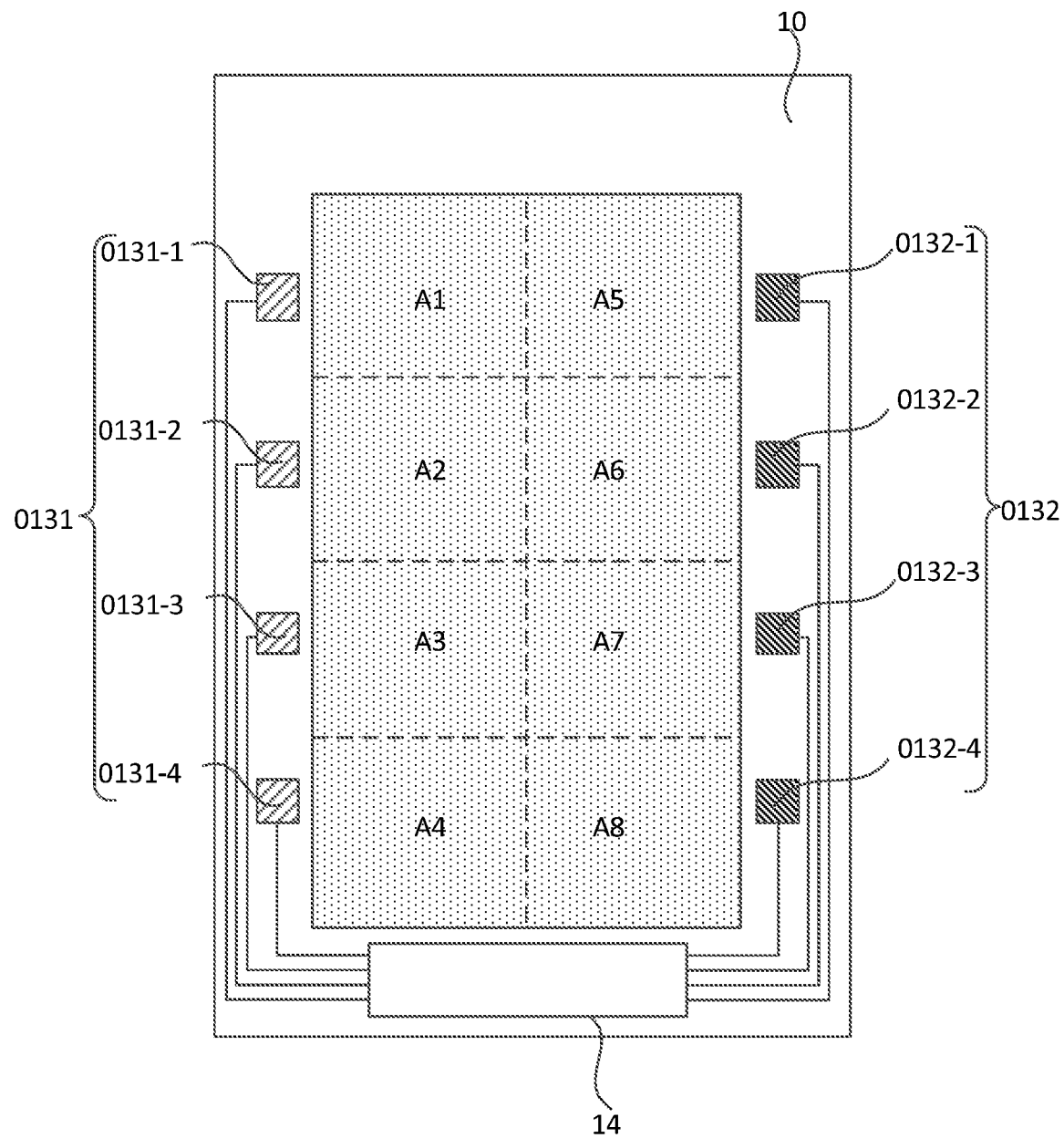
FIG. 6 is a structure diagram of another touch panel according to an embodiment of the present disclosure.

FIG. 6 is a structure diagram of another touch panel according to an embodiment of the present disclosure. Referring to FIG. 6, the touch panel includes eight touch areas (i.e., a touch area A1, a touch area A2, a touch area A3, a touch area A4, a touch area A5, a touch area A6, a touch area A7 and a touch area A8) and four pressure sensor groups. The eight touch areas are arranged in a matrix of four rows and two columns on the touch panel. A first side (left side of the substrate 10 in FIG. 6) in a row direction of each touch area is provided with the first-type pressure sensor 0131 and a second side (right side of the substrate 10 in FIG. 6) opposite to the first side is provided with the second-type pressure sensor 0132. A first-type pressure sensor 0131 and a second-type pressure sensor 0132 in the same row as the touch area form one pressure sensor group, and the touch area corresponds to the pressure sensor group in the same row as the touch area and to the closest pressure sensor among the pressure sensor groups in adjacent rows. Exemplarily, in FIG. 6, the touch area A2 corresponds to the pressure sensor group formed by the first-type pressure sensor 0131-2 and the second-type pressure sensor 0132-2 and to the first-type pressure sensor 0131-1. Alternatively, the touch area A2 corresponds to the pressure sensor group formed by the first-type pressure sensor 0131-2 and the second-type pressure sensor 0132-2 and to the first-type pressure sensor 0131-3.

Figure 7:
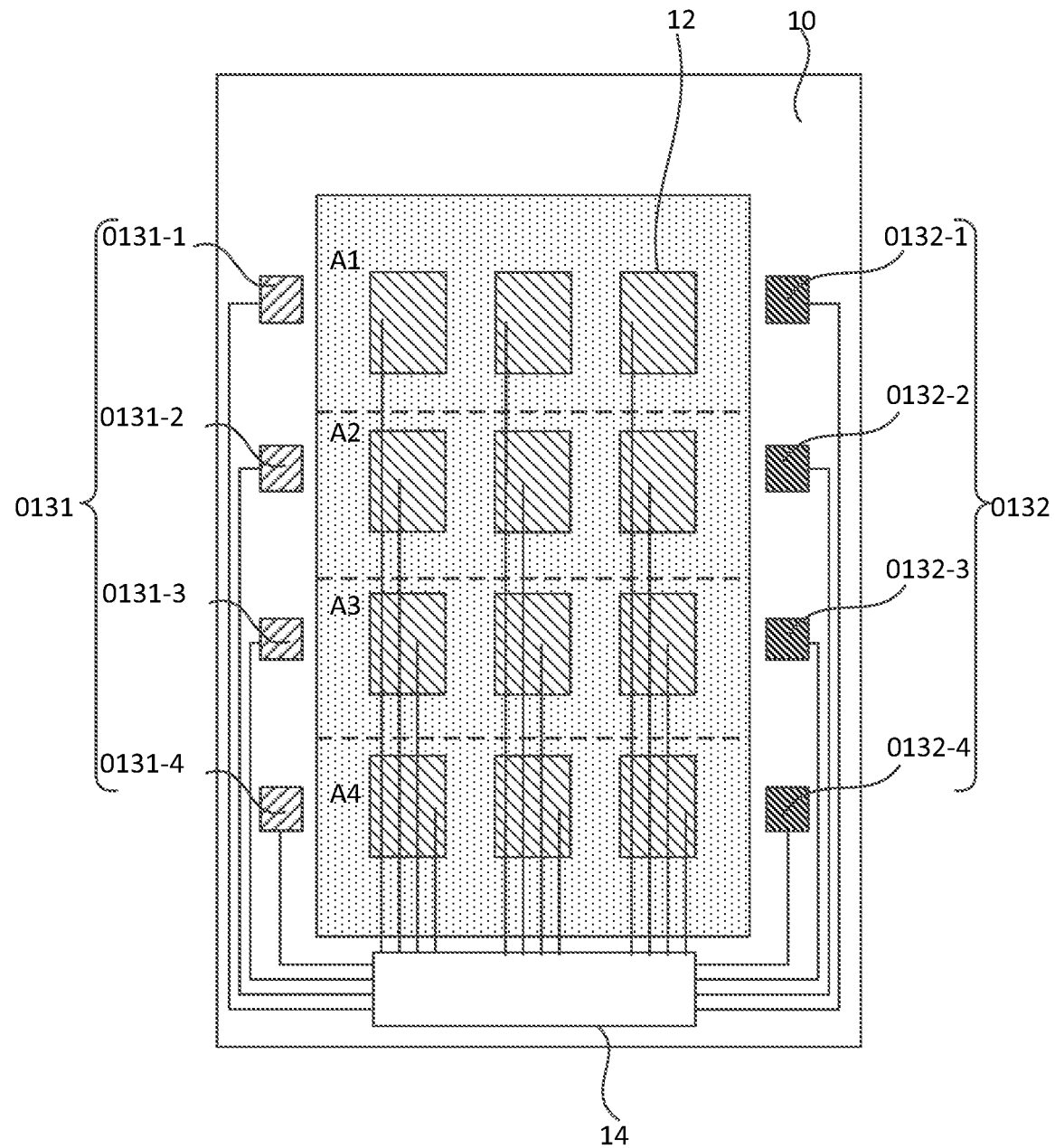
FIG. 7 is a structure diagram of another touch panel according to an embodiment of the present disclosure.

In the above technical solution, the touch position detection apparatus may use various structures. For example, the touch position detection apparatus may be a self-capacitive touch electrode or a mutual-capacitive touch electrode. FIG. 7 is a structure diagram of another touch panel according to an embodiment of the present disclosure. Exemplarily, referring to FIG. 7, the touch position detection apparatus is a self-capacitive touch electrode.

Exemplarily, the operating principle of the self-capacitive touch electrode as a touch position detection apparatus will be described below. Optionally, as shown in FIG. 7, a plurality of self-capacitive touch electrodes 12 are disposed on the touch panel. Each self-capacitive touch electrode 12 is a block electrode, corresponds to a certain coordinate position and constitutes a capacitance together with the ground. When a finger touches the touch panel, the capacitance of the finger is superimposed on the touch electrode 12 that the finger touches to cause a variation in the capacitance between the ground and the touch electrode 12 that the finger touches. Since the signal variation of each touch electrode 12 reflects the signal variation of the capacitance between each touch electrode 12 and the ground, the touch electrode 12 whose signal has undergone a variation can be determined after the signal variation of each touch electrode 12 is detected and then the touch position of the finger can be determined based on the coordinates of the touch electrode 12 whose signal has undergone a variation.

In the above technical solution, there are various implementations in a variety of ways of the processor 14 for controlling the touch position detection apparatuses to detect a current touch position, determining the touch area and calculating the touch pressure intensity according to pressure detection signals of the pressure sensor group corresponding to the touch area. For example, the processor 14 controls the touch position detection apparatuses to detect the current touch position; determines the touch area to which the current touch position belongs; turns on the first-type pressure sensor 0131 and the second-type pressure sensor 0132 corresponding to the touch area; detects the first pressure detection signal output from the first-type pressure sensor 0131 and the second pressure detection signal output from the second-type pressure sensor 0132, and calculates the first pressure intensity based on the first pressure detection signal and the second pressure intensity based on the second pressure detection signal; and obtains a touch pressure intensity based on the first pressure intensity and the second pressure intensity. For example, the processor 14 obtains the touch pressure intensity according to the functional relationship among the touch pressure intensity, the first pressure intensity and the second pressure intensity. In the case where the same position of the touch panel is pressed twice in succession using the same amount of force, the touch pressure intensities of the first-type pressure sensor 0131 and the second-type pressure sensor 0132 of the same pressure sensor group satisfy the formula $F1+F3=F2+F4$. $F1$ is the first pressure intensity obtained during the first pressing of the first-type pressure sensor 0131, $F2$ is the first pressure intensity obtained during the second pressing of the first-type pressure sensor 0131, $F3$ is the second pressure intensity obtained during the first pressing of the second-type pressure sensor 0132, and $F4$ is the second pressure intensity obtained during the second pressing of the second-type pressure sensor 0132. Such configurations are substantially to enable the first pressure intensities and the second pressure intensities to be mutually adjusted to achieve the purpose of improving the pressure detection performance of the touch panel.

In practical configurations, there are a plurality of forms of the functional relationship among the touch pressure intensity and the first pressure intensity and the second pressure intensity. Optionally, the functional relationship among the touch pressure intensity and the first pressure intensity and the second pressure intensity is as follows: the touch pressure intensity is equal to the average of the first pressure intensity and the second pressure intensity. Alternatively, the functional relationship among the touch pressure intensity and the first pressure intensity and the second pressure intensity is as follows: the touch pressure intensity is equal to the sum of the first pressure intensity and the second pressure intensity. In practice, the more complex the functional relationship among the touch pressure intensity and the first pressure intensity and the second pressure intensity, the more time is required for calculating the touch pressure intensity based on the first pressure intensity and the second pressure intensity and the more response time is required for an electronic device provided with the touch panel to perform corresponding operations according to the touch pressure intensity. Configuring the touch pressure intensity to be equal to the average of the first pressure intensity and the second pressure intensity or configuring the touch pressure intensity to be equal to the sum of the first pressure intensity and the second pressure intensity involves a simple calculation process and a short response time for the electronic device provided with the touch panel, thereby improving the user experience.

In the above technical solution, the first-type sensor 0131 and the second-type pressure sensor 0132 may use various structures, and the first-type sensor 0131 and the second-type pressure sensor 0132 may use the same or different structures. Exemplarily, two types of pressure sensor structures are described below. These structures are not intended to limit the present disclosure.

Figure 8:
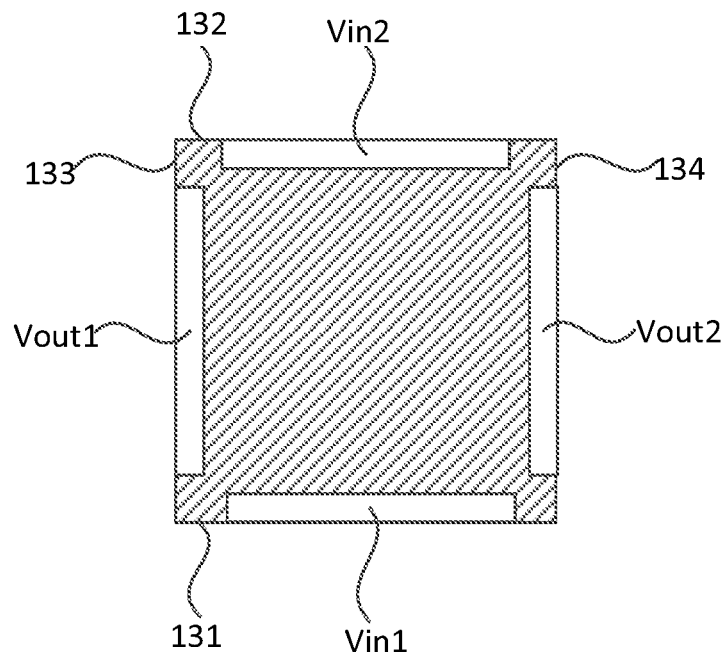
FIG. 8 is a structure diagram of a pressure sensor according to an embodiment of the present disclosure.

FIG. 8 is a structure diagram of a pressure sensor according to an embodiment of the present disclosure. Referring to FIG. 8, a shape of the pressure sensor is a quadrangle, which is made from a semiconductor material and includes a first side 131 and a second side 132 disposed opposite to each other and a third side 133 and a fourth side 134 disposed opposite to each other. The pressure sensor includes a first power supply signal input terminal Vin1 at the first side 131 and a second power supply signal input terminal Vin2 at the second side 132 which are used for inputting a bias voltage signal to the pressure sensor. The pressure sensor (each of the first-type pressure sensor and second-type pressure sensor) further includes a first sensing signal measuring terminal Vout1 at the third side 133 and a second sensing signal measuring terminal Vout2 at the fourth side 134 which are used to output a pressure detection signal from the pressure sensor.

Figure 9:
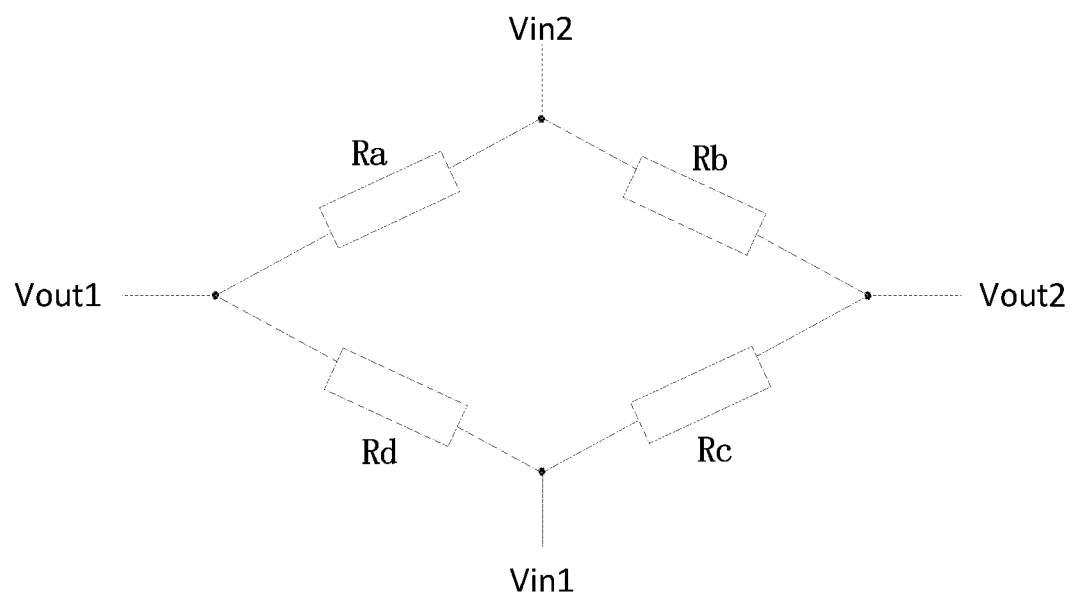
FIG. 9 is an equivalent related circuit diagram of the pressure sensor shown in FIG. 8.

FIG. 9 is an equivalent circuit diagram of the pressure sensor shown in FIG. 8. Referring to FIG. 8 and FIG. 9, the pressure sensor may be equivalent to a Wheatstone bridge. The Wheatstone bridge includes four equivalent resistors, i.e., an equivalent resistor Ra, an equivalent resistor Rb, an equivalent resistor Rc and an equivalent resistor Rd. The area between the second power supply signal input terminal Vin2 and the first sensing signal measuring terminal Vout1 is the equivalent resistance Ra. The area between the second power supply signal input terminal Vin2 and the second sensing signal measuring terminal Vout2 is the equivalent resistance Rb. The area between the first power supply signal input terminal Vin1 and the first sensing signal measuring terminal Vout1 is the equivalent resistance Rd. The area between the first power supply signal input terminal Vin1 and the second sensing signal measuring terminal Vout2 is the equivalent resistance Rc. When a bias voltage signal is inputted to the first power supply signal input terminal Vin1 and the second power supply signal input terminal Vin2, a current flows through each branch in the Wheatstone bridge. In this case, when the touch panel is pressed, the impedance of at least one of the equivalent resistor Ra, the equivalent resistor Rb, the equivalent resistor Rc and the equivalent resistor Rd changes due to shear force at the corresponding position on the touch panel, so that the difference between the pressure detection signal output from the first sensing signal measuring terminal Vout1 and the pressure detection signal output from the second sensing signal measuring terminal Vout2 is different from that before the pressing and accordingly the touch pressure intensity is determined.

Figure 10:
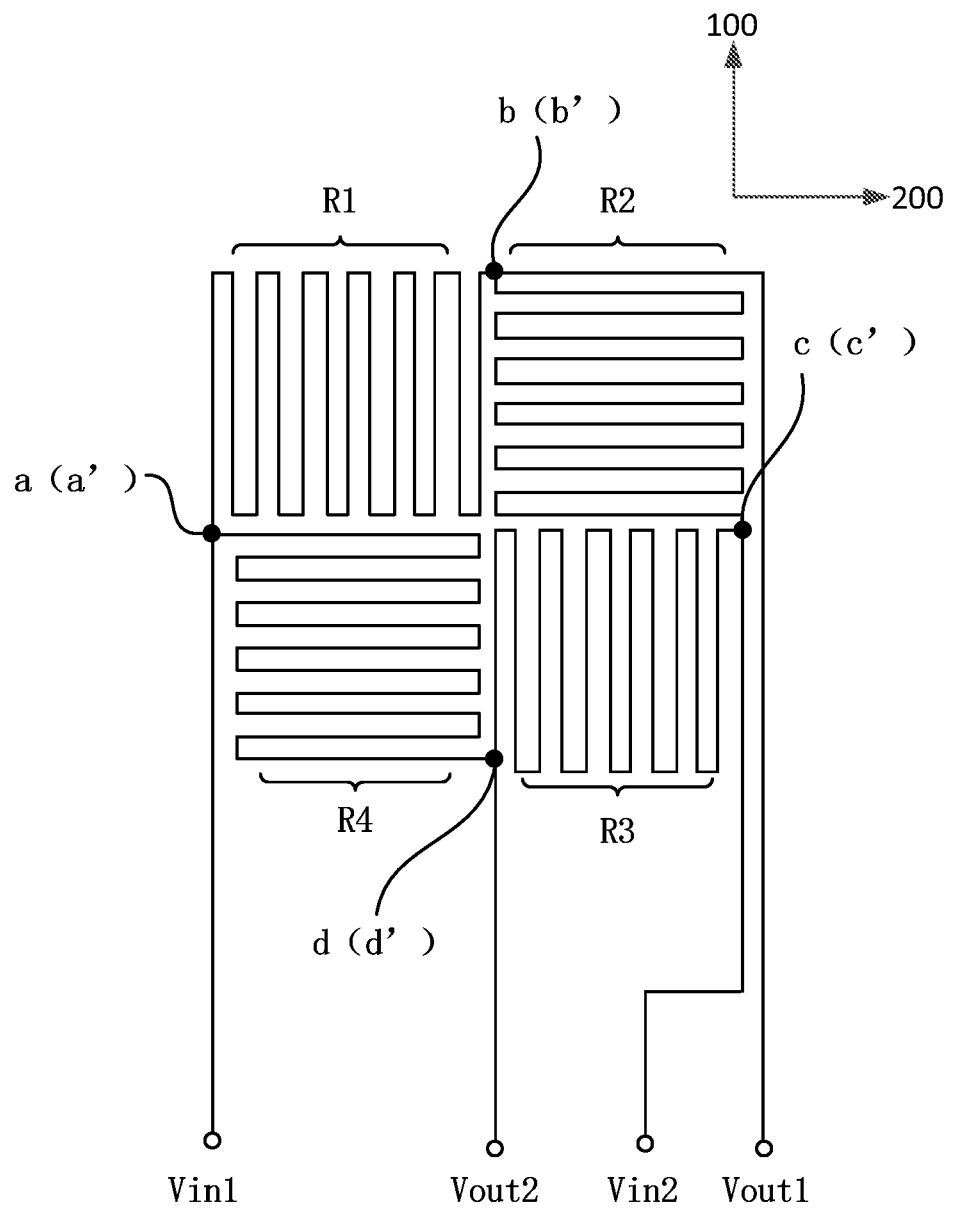
FIG. 10 is a structure diagram of another pressure sensor according to an embodiment of the present disclosure.

FIG. 10 is a structure diagram of another pressure sensor according to an embodiment of the present disclosure. Referring to FIG. 10, the pressure sensor includes a first sense resistor R1, a second sense resistor R2, a third sense resistor R3 and a fourth sense resistor R4. The first terminal a of the first sense resistor R1 and the first terminal a' of the fourth sense resistor R4 are electrically connected to a first power supply signal input terminal Vin1. The second terminal b of the first sense resistor R1 and the first terminal b' of the second sense resistor R2 are electrically connected to a first sensing signal measuring terminal Vout1. The second terminal d of the fourth sense resistor R4 and the first terminal d' of the third sense resistor R3 are electrically connected to a second sensing signal measuring terminal Vout2. The second terminal c of the second sense resistor R2 and the second terminal c' of the third sense resistor R3 are electrically connected to a second power supply signal input terminal Vin2. The first power supply signal input terminal Vin1 and the second power supply signal input terminal Vin2 are used for inputting a bias voltage signal to the pressure sensor. The first sensing signal measuring terminal Vout1 and the second sensing signal measuring terminal Vout2 are used for outputting a pressure detection signal from the pressure sensor.

Referring to FIG. 10, the first sense resistor R1, the second sense resistor R2, the third sense resistor R3 and the fourth sense resistor R4 form a Wheatstone bridge. When a bias voltage signal is inputted to the first power supply signal input terminal Vin1 and the second power supply signal input terminal Vin2, a current flows through each branch in the Wheatstone bridge. In this case, when the touch panel is pressed, the impedance of each of the first sense resistor R1, the second sense resistor R2, the third sense resistor R3 and the fourth sense resistor R4 changes due to shear force at the corresponding position on the touch panel, so that the difference between the electric signal output from the first sensing signal measuring terminal Vout1 and the electric signal output from the second sensing signal measuring terminal Vout2 is different from that before the pressing and accordingly the touch pressure intensity is determined.

It is to be noted that since the Wheatstone bridge is disposed on the display panel, when pressure is applied to the display panel, the display panel is deformed and the first sense resistor R1, the second sense resistor R2, the third sense resistor R3 and the fourth sense resistor R4 disposed on the display panel are all deformed. To detect the touch pressure intensity, deformations undergone by the first sense resistor R1, the second sense resistor R2, the third sense resistor R3 and the fourth sense resistor R4 need to be different.

Optionally, referring to FIG. 10, the pressure sensor further (each of the first-type pressure sensor and second-type pressure sensor) includes a first extension direction 100 and a second extension direction 200. The first extension direction 100 intersects the second extension direction 200. The component, in the first extension direction 100, of the extension length from the first terminal a to the second terminal b of the first sense resistor R1 is greater than that in the second extension direction 200. The component, in the second extension direction 200, of the extension length from the first terminal b' to the second terminal c of the second sense resistor R2 is greater than that in the second extension direction 100. The component, in the first extension direction 100, of the extension length from the first terminal d' to the second terminal c' of the third sense resistor R3 is greater than that in the second extension direction 200. The component, in the second extension direction 200, of the extension length from the first terminal a' to the second terminal d of the fourth sense resistor R4 is greater than that in the second extension direction 100.

Such configurations allow the first sense resistor R1 and the third sense resistor R3 to sense a strain in the first extension direction 100 and allow the second sense resistor R2 and the fourth sense resistor R4 to sense a strain in the second extension direction 200. Since the direction in which the first sense resistor R1 senses strain is different from the direction in which the second sense resistor R2 senses strain and the direction in which the fourth sense resistor R4 senses strain is different from the direction in which the third sense resistor R3 senses strain, the first sense resistor R1, the second sense resistor R2, the third sense resistor R3 and the fourth sense resistor R4 may be distributed in the same space or at positions close to each other so that the first sense resistor R1, the second sense resistor R2, the third sense resistor R3 and the fourth sense resistor R4 have a synchronous temperature change, thus eliminating the influence of temperature differences and improving the pressure sensing accuracy.

Figure 11:
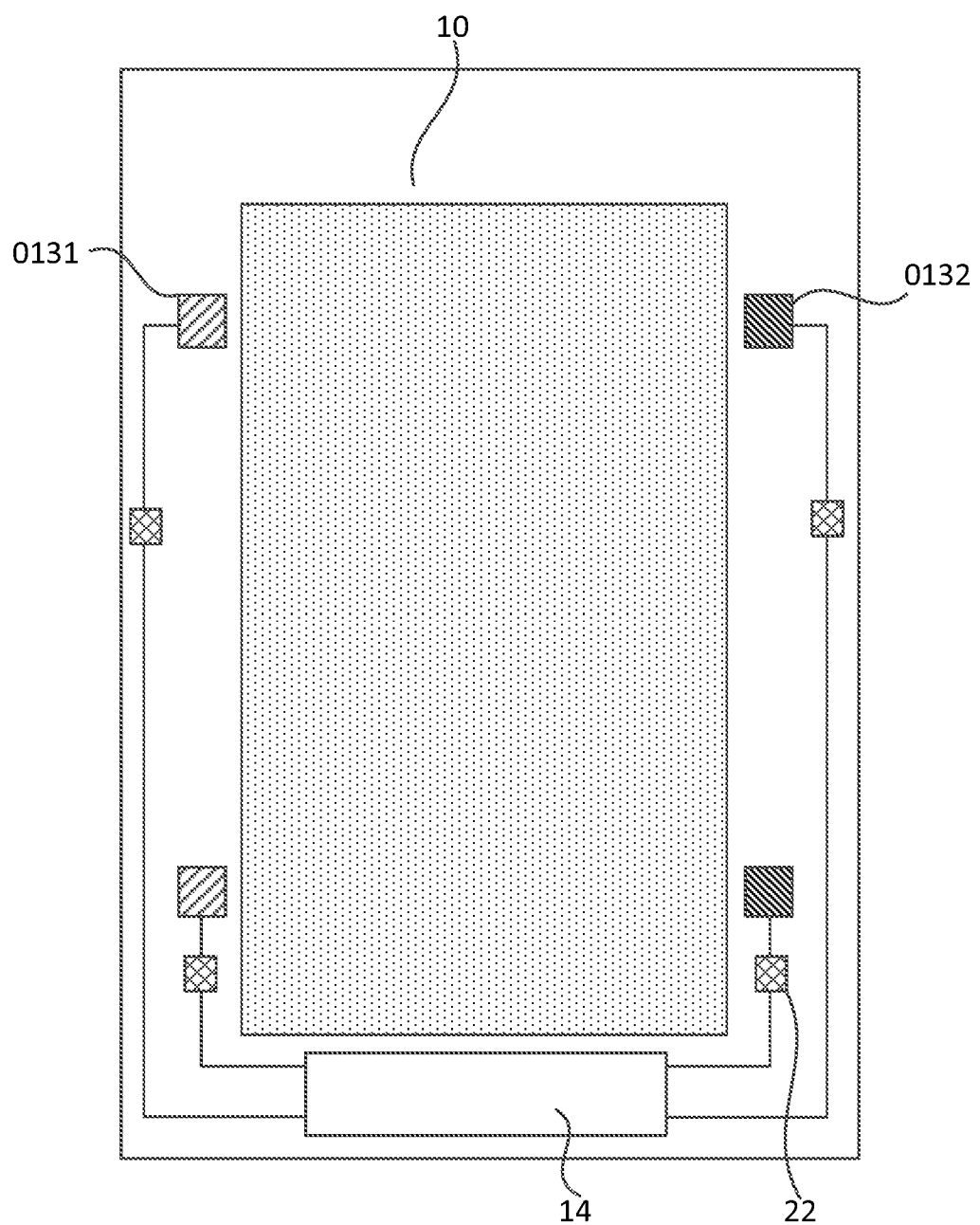
FIG. 11 is a structure diagram of another touch panel according to an embodiment of the present disclosure.

FIG. 11 is a structure diagram of another touch panel according to an embodiment of the present disclosure. Referring to FIG. 11, the touch panel may further include at least one control switch 22. The control switch 22 is electrically connected to the processor 14. Each control switch 22 is further electrically connected to the first-type pressure sensor 0131, and the processor 14 controls the operating state of the first-type pressure sensor 0131 by controlling connection or disconnection of the control switch 22; and/or each control switch 22 is further electrically connected to the second-type pressure sensor 0132, and the processor 14 controls the operating state of the second-type pressure sensor 0132 by controlling connection or disconnection of the control switch 22. Such configurations have the advantage of controlling the operating state of the first-type pressure sensor 0131 and the second-type pressure sensor 0132 based on the touch area to which a touch position belongs, thus achieving the purpose of improving the pressure detection performance of the touch panel. Furthermore, such configurations ensure that pressure sensors other than the first-type pressure sensor 0131 and the second-type pressure sensor 0132 corresponding to the touch area to which the touch position belongs are turned off, thus achieving the purpose of reducing power consumption and heat dissipation.

Figure 12:
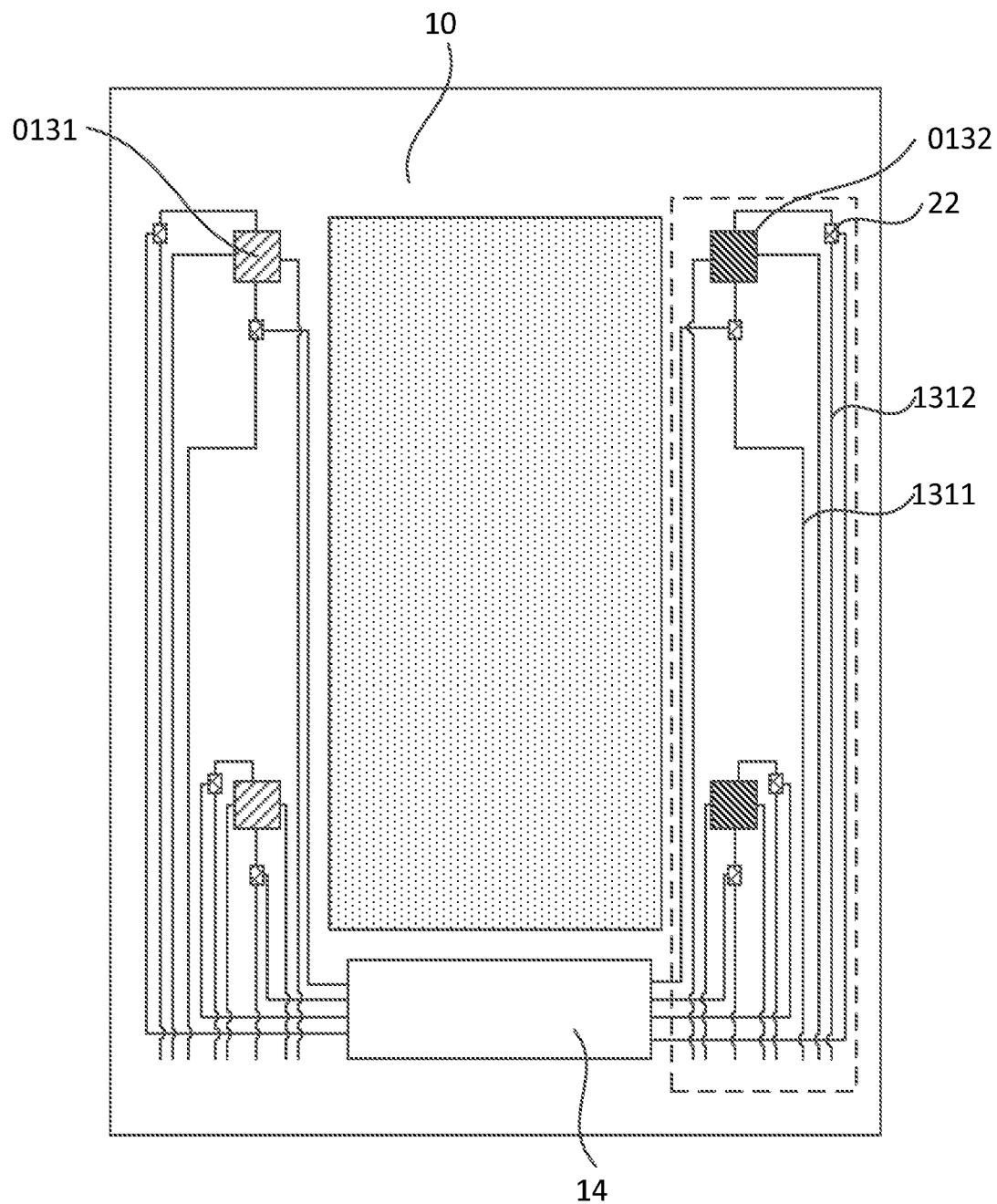
FIG. 12 is a structure diagram of another touch panel according to an embodiment of the present disclosure.
Figure 13:
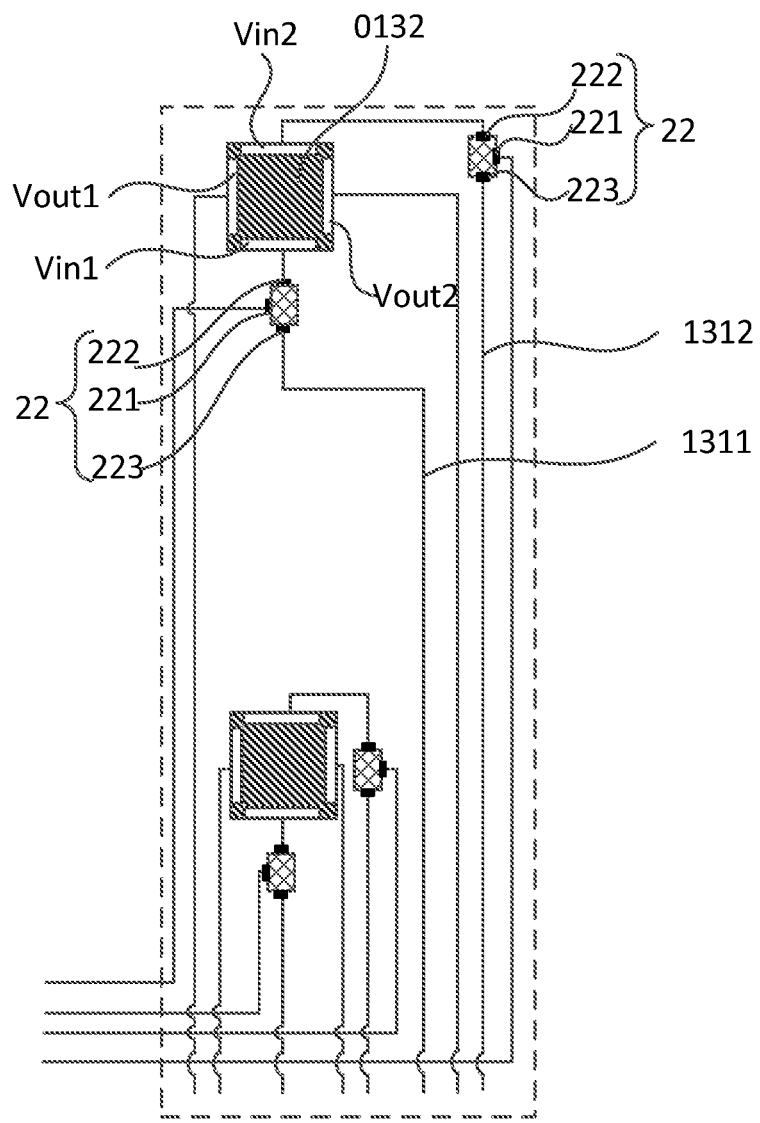
FIG. 13 is an enlarged view of the dotted-line-bounded area shown in FIG. 12.

FIG. 12 is a structure diagram of another touch panel according to an embodiment of the present disclosure. FIG. 13 is an enlarged view of the dotted-line-bounded area shown in FIG. 12. Referring to FIG. 12 and FIG. 13, the touch panel includes at least one first signal input line 1311 and at least one second signal input line 1312, and a control switch 22 includes a control terminal 221, a first electrode 222 and a second electrode 223. The control terminal 221 is electrically connected to a processor 14 and is used controlling connection or disconnection of the control switch 22. The first electrode 222 is electrically connected to the first power supply signal input terminal Vin1 of a pressure sensor (exemplarily the second-type pressure sensor 0132 in FIG. 12 and FIG. 13), and the second electrode 223 is electrically connected to the first signal input line 1311; or the first electrode 222 is electrically connected to the second power supply signal input terminal Vin2 of the pressure sensor, and the second electrode 223 is electrically connected to the second signal input line 1312. Such configurations have the advantage of enhancing independence of the first-type pressure sensor 0131 and the second-type pressure sensor 0132 and controlling the operating state of the first-type pressure sensor 0131 and the second-type pressure sensor 0132 according to the correspondence of the pressure sensor group and the touch area to which the touch position belongs, thus achieving the purpose of improving the pressure detection performance of the touch panel. Furthermore, such configurations ensure that pressure sensors other than the first-type pressure sensor 0131 and the second-type pressure sensor 0132 corresponding to the touch area to which the touch position belongs are turned off, thus achieving the purpose of reducing power consumption and heat dissipation.

Figure 14:
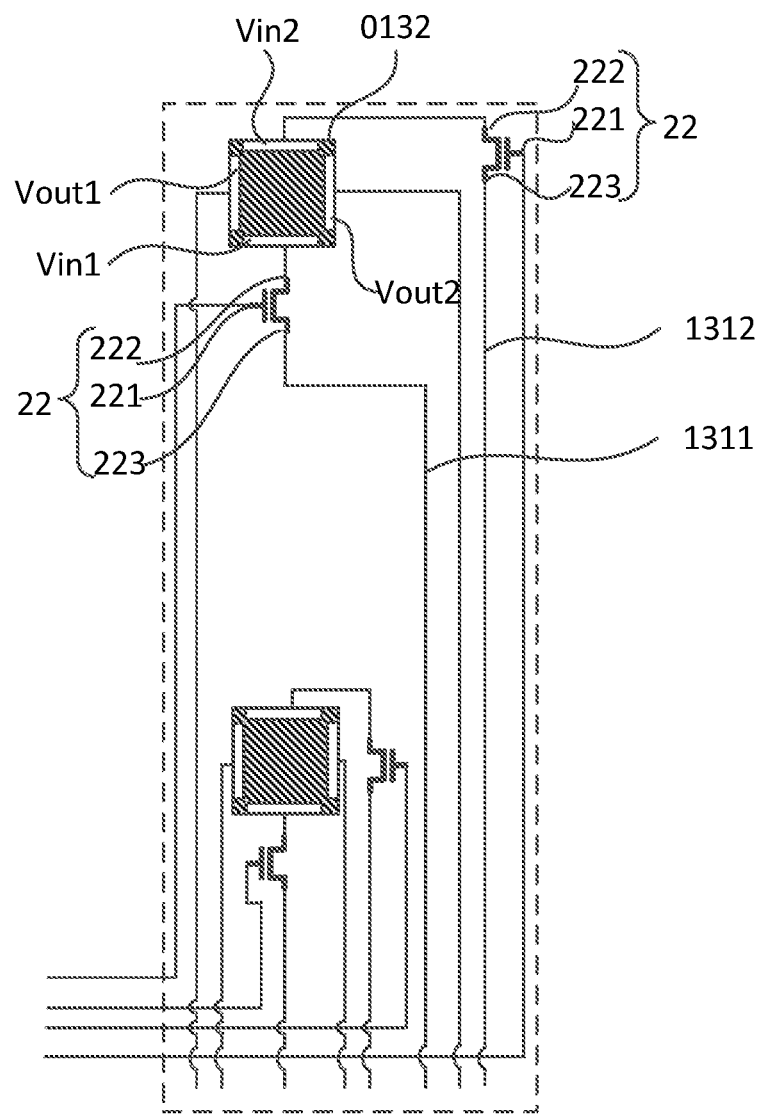
FIG. 14 is a partial structure diagram of another touch panel according to an embodiment of the present disclosure.

Specifically, the control switch may use various structures. FIG. 14 is a partial structure diagram of another touch panel according to an embodiment of the present disclosure. Exemplarily, FIG. 14 illustrates a structure that can be used as a control switch. Referring to FIG. 14, the control switch 22 includes a thin film transistor. The thin film transistor includes a source electrode, a drain electrode and a gate electrode. The source electrode is the second electrode 223 of the control switch 22, the drain electrode is the first electrode 222 of the control switch 22 and the gate electrode is the control terminal 221 of the control switch 22. The advantage of using the thin film transistor as the control switch is that the structure is simple and the bezel area required for manufacturing the thin film transistor is small, which meets the trend towards a narrow bezel. Moreover, if the touch panel is integrated with the display panel, the touch panel often includes a plurality of thin film transistors used for controlling the operation state of each pixel unit and a plurality of thin film transistors integrated into shift registers and used for producing scanning signals. Optionally, thin film transistors used as control switches are manufactured together with thin film transistors used for controlling the operation state of each pixel unit or thin film transistors used for producing scanning signals, thereby simplifying the manufacturing process and reducing the manufacturing cost.

Figure 15:
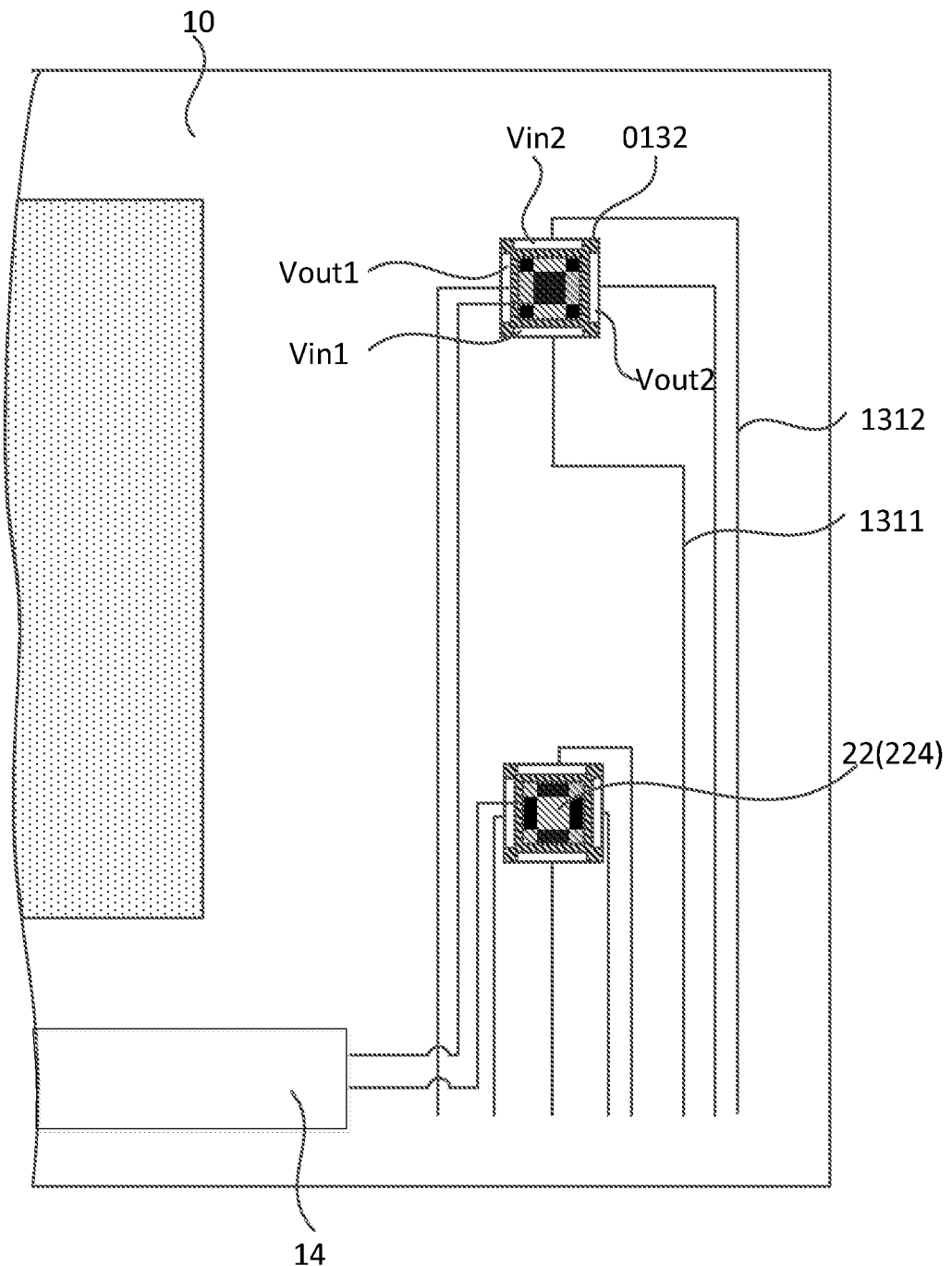
FIG. 15 is a partial structure diagram of another touch panel according to an embodiment of the present disclosure.

FIG. 15 is a partial structure diagram of another touch panel according to an embodiment of the present disclosure. Unlike the touch panel provided in the preceding embodiment, the control switch 22 shown in FIG. 15 includes a control electrode 224. Referring to FIG. 15, a vertical projection of the control electrode 224 on a substrate 10 coincides at least in part with the vertical projection of the pressure sensor (exemplarily a second-type pressure sensor 0132 in FIG. 15) on the substrate 10, and the control electrode 224 is disposed insulated from the pressure sensor and electrically connected to the processor 14. In this case, the control electrode 224 amounts to the gate electrode of the thin film transistor, and the area where the pressure sensor coincides with the vertical projection of the control electrode 224 of the pressure sensor amounts to the channel region of the thin film transistor. When the voltage on the control electrode 224 is increased to a certain extent, the channel region is conductive and in the normal operating state. Otherwise, the channel region is not conductive. Since the vertical projection of the control electrode 224 as the control switch 22 on the substrate 10 coincides at least in part with the vertical projection of the pressure sensor on the substrate 10, when viewed in a direction perpendicular to the touch panel, the control electrode 224 overlaps the pressure sensor and does not occupy the bezel area, which meets the trend towards a narrow bezel.

Figure 16:
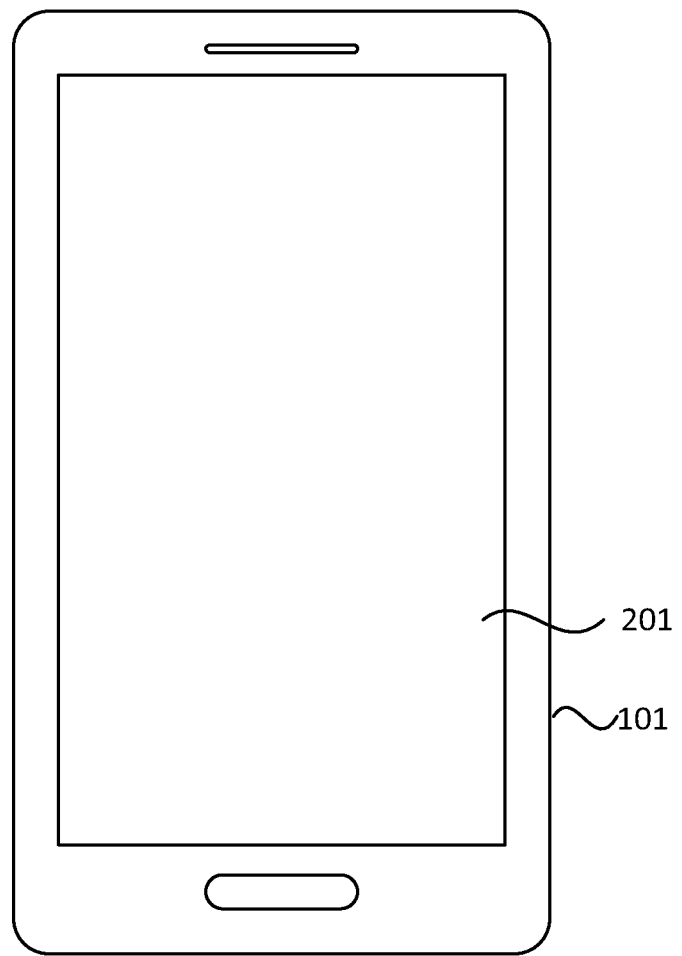
FIG. 16 is a structure diagram of a touch display device according to an embodiment of the present disclosure.

Another embodiment of the present disclosure provides a touch display device. FIG. 16 is a structure diagram of the touch display device according to an embodiment of the present disclosure. Referring to FIG. 16, the touch display device 101 includes the touch panel 201 of any one of the embodiments of the present disclosure. The touch display panel 101 may be a mobile phone, a tablet PC, an intelligent wearable device, etc.

In the touch display device provided by the embodiment of the present disclosure, the pressure sensor group is disposed on the touch panel. Each pressure sensor group includes a first-type pressure sensor and a second-type pressure sensor. The first-type pressure sensor is located on the first side of the substrate and the second-type pressure sensor is located on the second side opposite to the first side of the substrate so that the first-type pressure sensor and the second-type pressure sensor of the same pressure sensor group are symmetric about the centerline of the touch panel. Additionally, in the pressure detection stage, the touch pressure intensity is calculated according to pressure detection signals of the pressure sensor group corresponding to the touch area. Substantially, pressure detection signals output from the first-type pressure sensor and the second-type pressure sensor of the same pressure sensor group are used to mutually adjust touch pressure intensities. This eliminates pressure sensor baseline drifting when an existing touch panel is successively pressed and overcomes poor pressure detection performance of the touch panel, i.e., improves the pressure detection performance of the touch panel.

Figure 17:
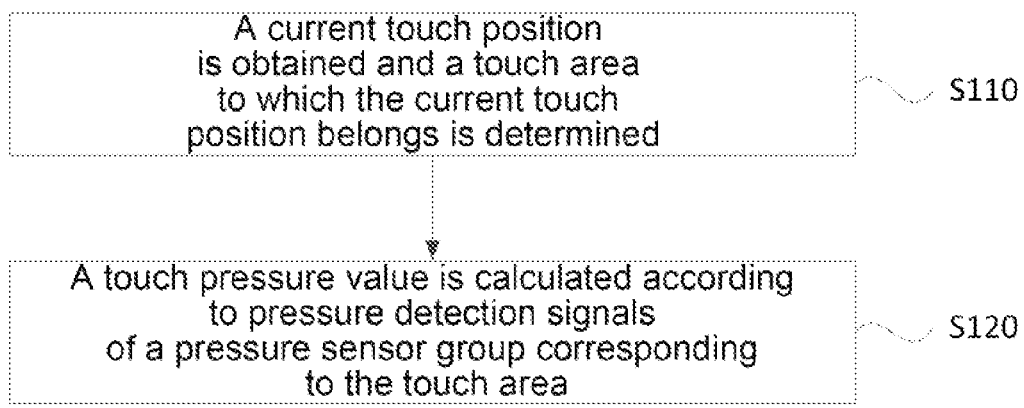
FIG. 17 is a flowchart illustrating a touch pressure detection method according to an embodiment of the present disclosure.

Another embodiment of the present disclosure provides a touch pressure detection method for the touch panel provided by any one of the embodiments of the present disclosure. FIG. 17 is a flowchart illustrating a touch pressure detection method according to an embodiment of the present disclosure. Referring to FIG. 17, the touch pressure detection method includes steps S110 and S120.

In S110, a current touch position is obtained and a touch area to which the current touch position belongs is determined.

In S120, a touch pressure intensity is calculated according to pressure detection signals of a pressure sensor group corresponding to the touch area.

Optionally, the touch pressure detection method includes:
controlling, by the processor, the touch position detection apparatus to detect a current touch position; and
determining, by the processor, the touch area and calculating, by the processor, a touch pressure intensity according to a pressure detection signal of the at least one pressure sensor group corresponding to the touch area.

In the touch pressure detection method provided by the embodiment of the present disclosure, the pressure sensor group is disposed on the touch panel. Each pressure sensor group includes a first-type pressure sensor and a second-type pressure sensor. The first-type pressure sensor is located on a first side of the substrate and the second-type pressure sensor is located on a second side opposite to the first side of the substrate so that the first-type pressure sensor and the second-type pressure sensor of the same pressure sensor group are symmetric about the centerline of the touch panel. Additionally, in the pressure detection stage, a touch pressure intensity is calculated according to pressure detection signals of the pressure sensor group corresponding to the touch area. Substantially, pressure detection signals output from the first-type pressure sensor and the second-type pressure sensor of the same pressure sensor group are used to mutually adjust touch pressure intensities. This eliminates pressure sensor baseline drifting when an existing touch panel is successively pressed and overcomes poor pressure detection performance of the touch panel, i.e., improves the pressure detection performance of the touch panel.

Furthermore, calculating the touch pressure intensity according to pressure detection signals of the pressure sensor group corresponding to the touch area includes:
turning on the first-type pressure sensor and the second-type pressure sensor corresponding to the touch area; and
detecting a first pressure detection signal output from the first-type pressure sensor and a second pressure detection signal output from the second-type pressure sensor, and calculating a first pressure intensity based on the first pressure detection signal and a second pressure intensity based on the second pressure detection signal.

Furthermore, the functional relationship among the touch pressure intensity and the first pressure intensity and the second pressure intensity is as follows:
The touch pressure intensity is equal to the average of the first pressure intensity and the second pressure intensity.

Furthermore, the functional relationship among the touch pressure intensity and the first pressure intensity and the second pressure intensity is as follows:
The touch pressure intensity is equal to the sum of the first pressure intensity and the second pressure intensity.

It is to be noted that the above are only preferred embodiments of the present disclosure and the technical principles used therein. It will be understood by those skilled in the art that the present disclosure is not limited to the embodiments described herein. Those skilled in the art can make various apparent changes, modifications, combinations and substitutions without departing from the scope of the present disclosure. Therefore, while the present disclosure has been described in detail via the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A touch panel, comprising:
a substrate, comprising a touchable area, wherein the touchable area comprises a plurality of touch areas;
a touch position detection apparatus disposed on the substrate;
a plurality of pressure sensor groups disposed outside the touchable area, wherein each of the plurality of pressure sensor groups comprises a first-type pressure sensor and a second-type pressure sensor;
wherein the first-type pressure sensors of the plurality of pressure sensor groups are disposed between the touchable area and a first edge of the substrate, the second-type pressure sensors of the plurality of pressure sensor groups are disposed between the touchable area and a second edge of the substrate, wherein the first edge is opposite to the second edge, wherein the first-type pressure sensor and the second-type pressure sensor of a same pressure sensor group are symmetric about a centerline of the touch panel; and each of the plurality of touch areas corresponds to at least one of the plurality of pressure sensor groups; and
a processor electrically connected to the touch position detection apparatus and the plurality of pressure sensor groups, wherein the processor controls the touch position detection apparatus to detect an instant touch position, determines the touch area with which the instant touch position is associated, and calculates a touch pressure intensity according to pressure detection signals of the at least one pressure sensor group corresponding to the touch area, wherein the touch panel is a rectangle, a number of the plurality of touch areas is 2N, and a number of the plurality of pressure sensor groups is N, wherein N is an integer greater than or equal to 1, wherein the 2N touch areas are arranged in a matrix of N rows and two columns on the touch panel, and each of the N pressure sensor groups consists of one first-type pressure sensor and one second-type pressure sensor, wherein the 2N touch areas comprise N first touch areas and N second touch areas, the N first touch areas are arranged in one of the two columns close to the first edge of the substrate, and the N second touch areas are arranged in the other one of the two columns close to the second edge of the substrate, wherein the touch pressure intensity of a touch pressure applied in the first touch area is calculated according to a first pressure detection signal output from the one first-type pressure sensor and a second pressure detection signal output from the one second-type pressure sensor of the pressure sensor group in a same row as the first touch area, and a third pressure detection signal output from the one first-type pressure sensor of the pressure sensor group in a row adjacent to the row where the first touch area is located, wherein the touch pressure intensity of a touch pressure applied in the second touch area is calculated according to a fourth pressure detection signal output from the one first-type pressure sensor and a fifth pressure detection signal output from the one second-type pressure sensor of the pressure sensor group in a same row as the second touch area, and a sixth pressure detection signal output from the one second-type pressure sensor of the pressure sensor group in a row adjacent to the row where the second touch area is located.

2. The touch panel of claim 1, wherein the processor calculates the touch pressure intensity in the following manner:
enabling the first-type pressure sensors and the second-type pressure sensors corresponding to the touch area with which the instant touch position is associated;
detecting a first pressure detection signal output from the first-type pressure sensor and a second pressure detection signal output from the second-type pressure sensor, and
calculating a first pressure intensity based on the first pressure detection signal and a second pressure intensity based on the second pressure detection signal; and
obtaining the touch pressure intensity based on a functional relationship among the touch pressure intensity and the first pressure intensity and the second pressure intensity.

3. The touch panel of claim 2, wherein the functional relationship is representative of an average of the first pressure intensity and the second pressure intensity being equal to the touch pressure intensity.

4. The touch panel of claim 2, wherein, the functional relationship is representative of a sum of the first pressure intensity and the second pressure intensity being equal to the touch pressure intensity.

5. The touch panel of claim 1,
wherein a shape of the first-type pressure sensor is a quadrangle, a shape of the second-type pressure sensor is a quadrangle, both of the first-type pressure sensor and the second-type pressure sensor are made from a semiconductor material; and wherein each of the first-type pressure sensor and the second-type pressure sensor comprises a first side and a second side disposed opposite to each other, and a third side and a fourth side disposed opposite to each other;
wherein each of the first-type pressure sensors and the second-type pressure sensor further comprises a first power supply signal input terminal at the first side and a second power supply signal input terminal at the second side, configured to input a bias voltage signal to said first-type and second-type pressure sensors; and
wherein each of the first-type pressure sensors and the second-type pressure sensor further comprises a first sensing signal measuring terminal at the third side and a second sensing signal measuring terminal at the fourth side configured to output a pressure detection signal from said first-type and second-type pressure sensors.

6. The touch panel of claim 5, further comprising at least one first control switch and at least one second control switch, wherein, the at least one first control switch and the at least one second control switch are electrically connected to the processor;
wherein the at least one first control switch is further electrically connected to the first-type pressure sensor in one of the at least one pressure sensor group, and wherein the processor controls an operating state of said first-type pressure sensor by turning on and turning off the at least one first control switch;
wherein the at least one second control switch is further electrically connected to the second-type pressure sensor in one of the at least one pressure sensor group; and
wherein the processor controls an operating state of the second-type pressure sensor by turning on and turning off the at least one second control switch.

7. The touch panel of claim 5, further comprising at least one first control switch, wherein, the at least one first control switch is electrically connected to the processor;
wherein the at least one first control switch is further electrically connected to the first-type pressure sensor in one of the at least one pressure sensor group, and the processor controls an operating state of the first-type pressure sensor by turning on and turning off the at least one first control switch.

8. The touch panel of claim 5, further comprising at least one second control switch, wherein, the at least one second control switch is electrically connected to the processor;
wherein the at least one second control switch is further electrically connected to the second-type pressure sensor in one of the at least one pressure sensor group, and the processor controls an operating state of the second-type pressure sensor by turning on and turning off the at least one second control switch.

9. The touch panel of claim 1, wherein, each of said first-type pressure sensor and said second-type pressure sensor comprises a first sense resistor, a second sense resistor, a third sense resistor and a fourth sense resistor, wherein
a first terminal of the first sense resistor and a first terminal of the fourth sense resistor are electrically connected to a first power supply signal input terminal, a second terminal of the first sense resistor and a first terminal of the second sense resistor are electrically connected to a first sensing signal measuring terminal, a second terminal of the fourth sense resistor and a first terminal of the third sense resistor are electrically connected to a second sensing signal measuring terminal, and a second terminal of the second sense resistor and a second terminal of the third sense resistor are electrically connected to a second power supply signal input terminal; and wherein the first power supply signal input terminal and the second power supply signal input terminal are configured to input a bias voltage signal to said pressure sensor, and the first sensing signal measuring terminal and the second sensing signal measuring terminal are configured to output a pressure detection signal from the said pressure sensor.

10. The touch panel of claim 9, further comprising at least one first control switch and at least one second control switch, wherein the at least one first control switch and the at least one second control switch are electrically connected to the processor;

wherein the at least one first control switch is further electrically connected to the first-type pressure sensor, and the processor controls an operating state of the first-type pressure sensor by turning on and turning off the at least one first control switch; and wherein the at least one second control switch is further electrically connected to the second-type pressure sensor, and the processor controls an operating state of the second-type pressure sensor by turning on and turning off the at least one second control switch.

11. The touch panel of claim 9, further comprising at least one first control switch, wherein the at least one first control switch is electrically connected to the processor;

wherein the at least one first control switch is further electrically connected to the first-type pressure sensor, and wherein the processor controls an operating state of the first-type pressure sensor by turning on and turning off the at least one first control switch.

12. The touch panel of claim 9, further comprising at least one second control switch, wherein the at least one second control switch is electrically connected to the processor; wherein the at least one second control switch is further electrically connected to the second-type pressure sensor, and wherein the processor controls an operating state of the second-type pressure sensor by turning on and turning off the at least one second control switch.

13. A touch display device, comprising a touch panel, wherein the touch panel comprises:

a substrate comprising a touchable area, wherein the touchable area comprises a plurality of touch areas;

a touch position detection apparatus disposed on the substrate;

a plurality of pressure sensor groups disposed outside the touchable area, wherein each of the plurality of pressure sensor groups comprises a first-type pressure sensor and a second-type pressure sensor;

wherein the first-type pressure sensors of the plurality of pressure sensor groups are disposed between the touchable area and a first edge of the substrate, the second-type pressure sensors of the plurality of pressure sensor groups are disposed between the touchable area and a second edge of the substrate, wherein the first edge is opposite to the second edge, wherein the first-type pressure sensor and the second-type pressure sensor of a same pressure sensor group are symmetric about a centerline of the touch panel; and wherein each of the plurality of touch areas corresponds to at least one of the plurality of pressure sensor groups; and a processor electrically connected to the touch position detection apparatus and the plurality of pressure sensor groups, wherein the processor controls the touch position detection apparatus to detect an instant touch position, determines the touch area with which the instant touch position is associated, and calculates a touch pressure intensity according to pressure detection signals of the at least one pressure sensor group corresponding to the touch area, wherein the touch panel is a rectangle, a number of the plurality of touch areas is 2N, and a number of the plurality of pressure sensor groups is N, wherein N is an integer greater than or equal to 1, wherein the 2N touch areas are arranged in a matrix of N rows and two columns on the touch panel, and each of the N pressure sensor groups consists of one first-type pressure sensor and one second-type pressure sensor, wherein the 2N touch areas comprises N first touch areas and N second touch areas, the N first touch areas are arranged in one of the two columns close to the first edge of the substrate, and the N second touch areas are arranged in the other one of the two columns close to the second edge of the substrate, wherein the touch pressure intensity of a touch pressure applied in the first touch area is calculated according to a first pressure detection signal output from the one first-type pressure sensor and a second pressure detection signal output from the one second-type pressure sensor of the pressure sensor group in a same row as the first touch area, and a third pressure detection signal output from the one first-type pressure sensor of the pressure sensor group in a row adjacent to the row where the first touch area is located, wherein the touch pressure intensity of a touch pressure applied in the second touch area is calculated according to a fourth pressure detection signal output from the one first-type pressure sensor and a fifth pressure detection signal output from the one second-type pressure sensor of the pressure sensor group in a same row as the second touch area, and a sixth pressure detection signal output from the one second-type pressure sensor of the pressure sensor group in a row adjacent to the row where the second touch area is located.

14. A touch pressure detection method for a touch panel, wherein the touch panel comprises:

a substrate, comprising a touchable area, wherein the touchable area comprises a plurality of touch areas;

a touch position detection apparatus disposed on the substrate;

a plurality of pressure sensor groups disposed outside the touchable area, wherein each of the plurality of pressure sensor groups comprises a first-type pressure sensor and a second-type pressure sensor;

wherein the first-type pressure sensors of the plurality of pressure sensor groups are disposed between the touchable area and a first edge of the substrate, the second-type pressure sensors of the plurality of pressure sensor groups are disposed between the touchable area and a second edge of the substrate, wherein the first edge is opposite to the second edge, wherein the first-type pressure sensor and the second-type pressure sensor of a same pressure sensor group are symmetric about a centerline of the touch panel; and each of the plurality of touch areas corresponds to at least one of the plurality of pressure sensor groups;

wherein the touch panel is a rectangle, a number of the plurality of touch areas is 2N, and a number of the plurality of pressure sensor groups is N, wherein N is an integer greater than or equal to 1, wherein the 2N touch areas are arranged in a matrix of N rows and two columns on the touch panel, and each of the N pressure sensor groups consists of one first-type pressure sensor and one second-type pressure sensor, wherein the 2N touch areas comprises N first touch areas and N second touch areas, the N first touch areas are arranged in one of the two columns close to the first edge of the substrate, and the N second touch areas are arranged in the other one of the two columns close to the second edge of the substrate, wherein the touch pressure intensity of a touch pressure applied in the first touch area is calculated according to a first pressure detection signal output from the one first-type pressure sensor and a second pressure detection signal output from the one second-type pressure sensor of the pressure sensor group in a same row as the first touch area, and a third pressure detection signal output from the one first-type pressure sensor of the pressure sensor group in a row adjacent to the row where the first touch area is located, wherein the touch pressure intensity of a touch pressure applied in the second touch area is calculated according to a fourth pressure detection signal output from the one first-type pressure sensor and a fifth pressure detection signal output from the one second-type pressure sensor of the pressure sensor group in a same row as the second touch area, and a sixth pressure detection signal output from the one second-type pressure sensor of the pressure sensor group in a row adjacent to the row where the second touch area is located;

and
a processor;

wherein the touch pressure detection method comprises:
controlling, by the processor, the touch position detection apparatus to detect an instant touch position;
determining, by the processor, the touch area with which the instant touch position is associated; and
calculating, by the processor, a touch pressure intensity according to pressure detection signals output from the at least one pressure sensor group corresponding to the touch area.

15. The touch pressure detection method of claim 14, wherein calculating the touch pressure intensity according to the pressure detection signals output from the at least one pressure sensor group corresponding to the touch area comprises:
enabling, by the processor, the first-type pressure sensor and the second-type pressure sensor corresponding to the touch area;
detecting, by the processor, a first pressure detection signal output from the first-type pressure sensor and a second pressure detection signal output from the second-type pressure sensor;
calculating, by the processor, a first pressure intensity based on the first pressure detection signal and a second pressure intensity based on the second pressure detection signal; and
obtaining the touch pressure intensity based on a functional relationship among the touch pressure intensity and the first pressure intensity and the second pressure intensity.

16. The touch pressure detection method of claim 15, wherein, a functional relationship is representative of an average of the first pressure intensity and the second pressure intensity being equal to the touch pressure intensity.

17. The touch pressure detection method as claimed in claim 15, wherein, a functional relationship is representative of a sum of the first pressure intensity and the second pressure intensity being equal to the touch pressure intensity.

* * * * *